(No Model.)

B. F. ANTHONY & J. CORON.
PIPE COUPLING.

No. 327,982. Patented Oct. 13, 1885.

Witnesses
F. A. Spencer
E. A. Phelps

Inventors
Benjamin F. Anthony
Joseph Coron
by A. H. Reuer, atty

UNITED STATES PATENT OFFICE.

BENJAMIN F. ANTHONY AND JOSEPH CORON, OF BOSTON, MASS.

PIPE-COUPLING.

SPECIFICATION forming part of Letters Patent No. 327,982, dated October 13, 1885.

Application filed July 15, 1884. Serial No. 137,757. (No model.)

*To all whom it may concern:*

Be it known that we, BENJAMIN F. ANTHONY and JOSEPH CORON, citizens of the United States, residing at Boston, in the county of Suffolk and State of Masssachusetts, have jointly invented certain new and useful Improvements in Couplings for Lead Pipes; and we do hereby declare that the same are fully described in the following specification and illustrated in the accompanying drawings.

The object of this invention is to provide a secure coupling or joint for uniting lead pipes in such a manner that they may be disconnected when desired.

Figure 1:
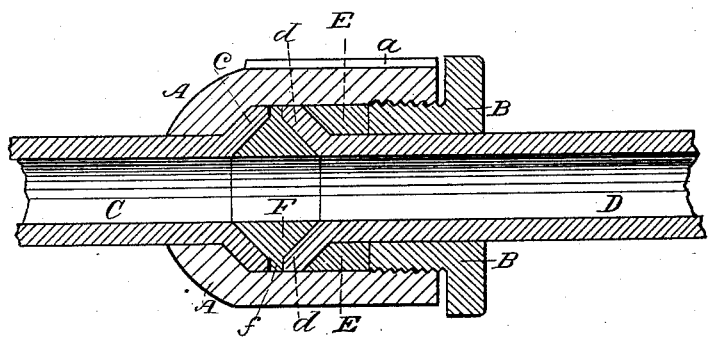
Figure 2:
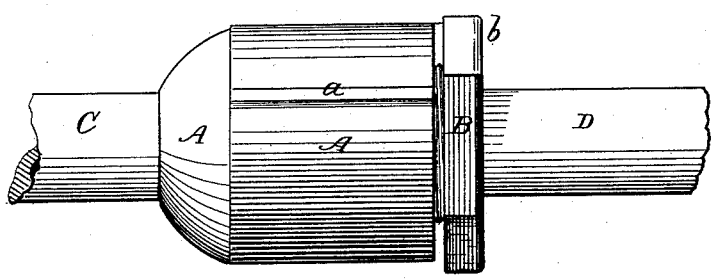

The peculiar features of our invention will be readily understood by reference to the drawings, which show, in Figure 1, a longitudinal section, and in Fig. 2 an external view of our improved joint.

A and B are the two threaded parts of a metal coupling slipped onto the ends of the pipes C D to be joined. The part A has a rib or projection, $a$, by which it may be held fast, while the part B is screwed into it by a wrench applied to its hexagonal flange $b$.

E is a ring or thick washer placed on the pipe D after the coupling-nut B is applied thereto. This ring is of such dimensions as to slip within the concavity of the part A of the coupling, and to fit approximately to the pipe D. It has a squared outer face to fit the inner end of the coupling-nut, and a beveled or flaring inner face, as shown in Fig. 1.

After the coupling-sleeve A is placed upon the pipe C, and the nut B and ring E put successively upon the pipe D, the adjacent ends of these pipes are reamed out and flared to a bevel of about forty-five degrees, as shown, the metal so displaced keeping the parts A, B, and E from detachment. Between these flared ends we introduce a doubly-beveled hard-metal ring F, its caliber corresponding with that of the pipes C and D, so as not to interrupt the flow of the liquid, and its faces beveled to the same angle as the flared flanges $c$ and $d$, so as to make a tight joint when the parts of the coupling are screwed up. A radial rib or flange, $f$, at the center or largest part of this ring has a diameter nearly equal to the inner diameter of the sleeve A, tending thus to locate the ring F centrally. The tips of the flaring flanges $c$ and $d$ may also bear against this rib and further secure against leakage. The coupling-sleeve A is beveled to fit snugly to the outer bevel-face of the flange $c$, and the beveled face of the ring E likewise fits the flaring face $d$ when said ring is pressed thereon by rotation of the nut B.

We disclaim the construction set forth in the British Patent No. 353 of 1852, for pipe-couplings, and in the United States patents to Weston, July 9, 1867, to Weiss, March 6, 1877, and to Guyer, September 19, 1876, as being for different combinations of parts from that constituting our invention.

We claim as our invention—

The pipes C and D, flared at their adjacent ends, and the interposed doubly-beveled ring F, corresponding thereto, in combination with the coupling-sleeve A, internally threaded, the nut B, engaging therewith, and the interposed ring E, having one plane face and one beveled face, substantially as and for the purpose set forth.

In testimony whereof we hereto affix our signatures in presence of two witnesses.

BENJ. F. ANTHONY.
JOSEPH CORON.

Witnesses:
 A. H. SPENCER,
 C. G. KEYES.